3,226,414
ORGANIC ISOCYANATES STABILIZED WITH DINITROGEN COMPOUNDS
Eric Smith, New Haven, Conn., assignor to Olin Mathieson Chemical Corporation, a corporation of Virginia
No Drawing. Filed Mar. 20, 1963, Ser. No. 266,481
10 Claims. (Cl. 260—453)

This invention relates to organic isocyanate compounds stabilized against discoloring, and to the process for preparing them.

Organic isocyanates have been used extensively as a reactant in processes for the preparation of polyurethane surface coatings and the like. One problem encountered in such processes is that organic isocyanates, such as toluene diisocyanate, become discolored when stored for extended periods prior to use. The normally colorless isocyanate develops a deep yellow color after extended storage periods. One reason that such discolored organic isocyanates are undesirable is because they impart an undesirable yellow color to the resulting polyurethane surface coating. Various additives have been employed to stabilize the organic isocyanates against discoloring. However, in general, these additives are either too expensive because large proportions of the additives are required to effect the desired degree of stabilization, or else the additives are not effective for extended periods of storage.

It is a primary object of this invention to provide organic isocyanate compositions stabilized against discoloring.

Another object of the invention is to provide toluene diisocyanate compositions stabilized against discoloring.

A further object of the invention is provide a process for stabilizing organic isocyanates against discoloring.

It is another object of the invention to provide a process for stabilizing toluene diisocyanate against discoloring.

These and other objects of the invention which overcome the disadvantages of the prior art will be apparent from the following detailed description of the invention.

It has now been discovered that the aforesaid objects can be accomplished when an organic isocyanate is admixed with a stabilizing proportion of a dinitrogen compound selected from the group consisting of a cyanamide, methyl cyanamide, imidazole, and methyl imidazole.

The stabilizing proportion of dinitrogen compound stabilizer is generally between about 10 and 2000 parts, and preferably between about 25 and about 1500 parts per million by weight of the organic isocyanate. However, any proportion of the dinitrogen compound capable of effecting stabilization without adversely diluting the organic stabilizer may be employed.

The aforesaid dinitrogen compounds are generally soluble in liquid organic isocyanates and can be readily admixed with liquid organic isocyanate simply by agitating the stabilizing proportion of the dinitrogen compound in the organic isocyanate. When the organic isocyanate is a solid, it is heated to effect melting thereof and then admixed with the dinitrogen compound until the stabilizer is dissolved.

Typical examples of organic isocyanates which can be stabilized in accordance with the technique of this invention include 2,4-toluene diisocyanate, 2,6-toluene diisocyanate, 4,4'-methylenediphenylisocyanate, 4,4'-methylenedi-ortho-tolylisocyanate, 2,4,4'-triisocyanatodiphenyl- ether, toluene-2,4,6-triisocyanate, 1-methoxy-2,4,6-benzenetriisocyanate, metaphenylenediisocyanate, 4-chlorometa-phenylenediisocyanate, 4,4'-biphenyldiisocyanate, 1,5 - naphthalenediisocyanate, 1,4-tetramethylenediisocyanate, 1,6-hexamethylenediisocyanate, 1,10-decamethylenediisocyanate, 1,4-cyclohexanediisocyanate, 4,4'-methylenebis(cyclohexylisocyanate), 1,5-tetrahydronaphthalenediisocyanate, ortho-, meta- or para-tolueneisocyanate, alpha and beta-naphthyleneisocyanate, 4-methoxy-meta-phenylenediisocyanate, and the like.

Organic isocyanate stabilized in accordance with the technique of this invention can be stored for several months without appreciable discoloring.

The following examples are presented to further illustrate the invention without any intention of being limited thereby. All parts and percentages are by weight unless otherwise specified.

*Examples I–II*

Three vials having a capacity of 16 milliliters each were employed in carrying out these examples. The vials were cleaned, dried and the screw caps were lined with aluminum foil. Each vial was filled with 10 milliliters (12.2 grams) of colorless toluene diisocyanate which contained 80 percent 2,4-toluene diisocyanate and 20 percent 2,6-toluene diisocyanate. To each of two vials was added one dinitrogen stabilizer compound in the proportion indicated below in the table. The contents of the vials were heated to about 80° C. to dissolve the solid stabilizers and then cooled under nitrogen to room temperature. The nitrogen in the vials was replaced with air, the vials were recapped, and stored at room temperature for 28 days. No stabilizer was added to the third vial.

The table also sets forth the color of the sample obtained after storage.

| Example | Stabilizer | Proportion of Stabilizer, Grams | Appearance after Storage Period |
|---|---|---|---|
| I | Cyanamide | 0.0122 | Colorless. |
| II | Imidazole | 0.0152 | Slightly discolored. |

For purposes of comparison, the third vial to which no stabilizer had been added was discolored with a yellow color after standing 2½ days.

Various modifications of the invention may be employed without departing from the spirit of the invention.

I claim:

1. An organic isocyanate containing a stabilizing proportion of a dinitrogen compound selected from the group consisting of cyanamide, methyl cyanamide, imidazole, and methyl imidazole.

2. The composition of claim 1 wherein the stabilizing proportion of said dinitrogen compound is between about 10 and about 2000 parts per million by weight.

3. The composition of claim 1 wherein the stabilizing proportion of said dinitrogen compound is between about 25 and about 1500 parts per million by weight.

4. Toluene diisocyanate stabilized against discoloring comprised of toluene diisocyanate containing a stabilizing proportion of a dinitrogen compound selected from the group consisting of cyanamide, methyl cyanamide, imidazole and methyl imidazole.

5. The composition of claim 4 wherein said dinitrogen compound is cyanamide.

6. The composition of claim 4 wherein said dinitrogen compound is methyl cyanamide.

7. The composition of claim 4 wherein said dinitrogen compound is imidazole.

8. The composition of claim 4 wherein said dinitrogen compound is methyl imidazole.

9. Toluene diisocyanate stabilized against discoloring comprised of toluene diisocyanate containing between about 10 and about 2000 parts per million by weight of dinitrogen compound selected from the group consisting of cyanamide, methyl cyanamide, imidazole and methyl imidazole.

10. Toluene diisocyanate stabilized against discoloring comprised of toluene diisocyanate containing between about 25 and about 1500 parts per million by weight of dinitrogen compound selected from the group consisting of cyanamide, methyl cyanamide, imidazole and methyl imidazole.

References Cited by the Examiner
UNITED STATES PATENTS 3,050,520   8/1962   Erner et al. _____ 252—300 X CHARLES B. PARKER, *Primary Examiner.*